United States Patent
Wettstein et al.

(10) Patent No.: US 8,661,780 B2
(45) Date of Patent: Mar. 4, 2014

(54) GAS TURBINE PLANT WITH EXHAUST GAS RECIRCULATION AND ALSO METHOD FOR OPERATING SUCH A PLANT

(75) Inventors: Hans Wettstein, Fislisbach (CH); Manfred Wirsum, Baden-Dattwil (CH); Steffen Schulz, Dresden (DE)

(73) Assignee: Alstom Technology Ltd., Baden (CH)

( * ) Notice: Subject to any disclaimer, the term of this patent is extended or adjusted under 35 U.S.C. 154(b) by 2 days.

(21) Appl. No.: 13/094,601

(22) Filed: Apr. 26, 2011

(65) Prior Publication Data
US 2012/0036860 A1    Feb. 16, 2012

Related U.S. Application Data

(63) Continuation of application No. PCT/EP2009/063454, filed on Oct. 15, 2009.

(30) Foreign Application Priority Data

Oct. 29, 2008  (CH) .................................... 1700/08

(51) Int. Cl.
    *F02C 3/34*    (2006.01)
    *F02C 7/10*    (2006.01)
    *F02C 7/12*    (2006.01)

(52) U.S. Cl.
    USPC ................... 60/39.52; 60/39.511; 60/806

(58) Field of Classification Search
    USPC ................... 60/39.511, 39.52, 806
    See application file for complete search history.

(56) References Cited

U.S. PATENT DOCUMENTS

| | | | | |
|---|---|---|---|---|
| 3,866,411 | A * | 2/1975 | Marion et al. | 60/39.52 |
| 5,104,419 | A * | 4/1992 | Funk | 48/209 |
| 6,269,624 | B1 | 8/2001 | Frutschi et al. | |
| 6,637,183 | B2 * | 10/2003 | Viteri et al. | 60/39.182 |
| 7,104,071 | B2 * | 9/2006 | Braun et al. | 60/775 |

(Continued)

FOREIGN PATENT DOCUMENTS

| | | |
|---|---|---|
| DE | 10050697 A1 | 4/2002 |
| DE | 10307606 A1 | 9/2003 |

(Continued)

OTHER PUBLICATIONS

WO 2008/065036 machine translation, done Jan. 15, 2013.*

*Primary Examiner* — Ted Kim
(74) *Attorney, Agent, or Firm* — Buchanan Ingersoll & Rooney PC

(57) ABSTRACT

A gas turbine plant is provided with exhaust gas recirculation and includes a main gas turbine having a main compressor and main turbine driving a main generator, and a combustion chamber, with an outlet connected to the inlet of the main gas turbine, has a fuel feed, and via the recuperator's high-pressure side obtains combustion air from the main gas turbine's compressor outlet. The outlet of the main turbine and the inlet of the main compressor are connected via the recuperator's low-pressure side and a cooler for exhaust gas recirculation. On the recuperator's low-pressure side, a charging unit, with a compressor and a turbine is arranged, and draws in air via an air intake and by the outlet of its compressor is connected to the recuperator's low-pressure side outlet and by the inlet of its turbine is connected to a surplus-gas extraction line on the recuperator's low-pressure side.

13 Claims, 5 Drawing Sheets

(56) References Cited

U.S. PATENT DOCUMENTS

| | | |
|---|---|---|
| 2002/0043063 A1* | 4/2002 | Kataoka et al. ............... 60/39.52 |
| 2004/0163391 A1* | 8/2004 | Frutschi .......................... 60/612 |
| 2005/0076645 A1 | 4/2005 | Frutschi et al. |
| 2006/0059909 A1* | 3/2006 | Spaeder et al. ................. 60/599 |
| 2006/0272331 A1 | 12/2006 | Bucker et al. |
| 2007/0034171 A1 | 2/2007 | Griffin et al. |
| 2008/0010967 A1 | 1/2008 | Griffin et al. |
| 2008/0104958 A1 | 5/2008 | Finkenrath et al. |

FOREIGN PATENT DOCUMENTS

| | | |
|---|---|---|
| DE | 10307374 A1 | 9/2004 |
| DE | 10360951 A1 | 7/2005 |
| DE | 102004039164 A1 | 3/2006 |
| DE | 102005015151 A1 | 10/2006 |
| DE | 102007053192 A1 | 5/2008 |
| EP | 0953748 A | 11/1999 |
| GB | 2140873 A | 12/1984 |
| WO | 2008065036 A | 6/2008 |

\* cited by examiner

GAS TURBINE PLANT WITH EXHAUST GAS RECIRCULATION AND ALSO METHOD FOR OPERATING SUCH A PLANT

CROSS REFERENCE TO RELATED APPLICATIONS

This application is a continuation of International Application No. PCT/EP2009/063454 filed Oct. 15, 2009, which claims priority to Swiss Patent Application No. 01700/08, filed Oct. 29, 2008, the entire contents of all of which are incorporated by reference as if fully set forth.

FIELD OF INVENTION

The present disclosure relates to the field of gas turbines, specifically to a gas turbine plant with exhaust gas recirculation and also to a method for operating such a plant. The disclosure further refers to a use or an application of the gas turbine plant or of the method for operating such a plant.

BACKGROUND

A method for operating a partially closed, charged gas turbine cycle and also a gas turbine system for carrying out the method has been known from printed publication DE-A1-103 07 374, in which exhaust gas turbochargers are used both as main machines and for charging. The disadvantage of this known solution, however, is that the potentials of this solution have not been recognized by professional circles for efficient $CO_2$ separation, for almost unlimited power increase and for incomparably high partial load efficiency with an exceptionally high overall efficiency.

Alternatively, a method for operating a power plant with a gas turbine, having a semi-closed, recuperated gas turbine cyclic process and also a power plant for carrying out the method, has been known from WO-A1-2008/065036, in which $CO_2$ is separated from the circulating operating fluid, at low or high pressure, in a manner which is not described further. Charging by means of a charging unit is not provided in this case.

SUMMARY

The present disclosure is directed to a gas turbine plant with exhaust gas recirculation, including at least one main gas turbine having at least one main compressor and at least one main turbine which drives a main generator or other machine, and at least one combustion chamber, an outlet of which is connected to an inlet of the at least one main turbine of the at least one main gas turbine. The combustion chamber has a fuel feed, and via a high-pressure side of a recuperator obtains combustion air from an outlet of the at least one main compressor of the at least one main gas turbine. An outlet of the at least one main turbine and an inlet of the at least one main compressor of the at least one main gas turbine are connected via a low-pressure side of the recuperator and a cooler for exhaust gas recirculation. On the low-pressure side of the recuperator a charging unit with a compressor and a turbine is arranged. The charging unit draws in air via an air intake and by an outlet of the compressor is connected to an outlet of the low-pressure side of the recuperator and by an inlet of the turbine is connected to a surplus-gas extraction line on the low-pressure side of the recuperator. A $CO_2$ separator separates $CO_2$ from recirculated exhaust gases of the at least one main gas turbine and/or from exhaust gas from the charging turbine.

The disclosure is also directed to a method for operating a gas turbine plant in a partially closed, charged gas turbine cycle. The method includes combusting fuel in a combustion chamber, feeding a gaseous compressed operating medium which contains combustion air. The method also includes expanding the operating medium, which contains hot combustion gases, in the main turbine of the main gas turbine, thereby performing work. The method further includes extracting heat from the expanded operating medium in a subsequent recuperator and in a cooler and compressing the cooled operating medium in a compressor of the main gas turbine, and heat is fed to the compressed operating medium in the recuperator before re-entry into the combustion chamber. The method also includes extracting on the low-pressure side of the recuperator a partial flow of the expanded operating medium at an extraction point which is at a suitable first temperature level, and further expanded in a turbine of a charging unit. The method further includes drawing in and compressing air by a compressor of the charging unit and feeding the compressed air to the operating medium on a low-pressure side of the recuperator.

BRIEF DESCRIPTION OF THE DRAWINGS

The invention shall subsequently be explained in more detail based on exemplary embodiments in conjunction with the drawing. All elements which are not required for the direct understanding of the invention have been omitted. Like elements are provided with the same designations in the various figures. The flow direction of the various media within the plant is indicated by arrows. In the drawing.

DETAILED DESCRIPTION OF THE PREFERRED EMBODIMENTS

Introduction to the Embodiments

Figure 1:
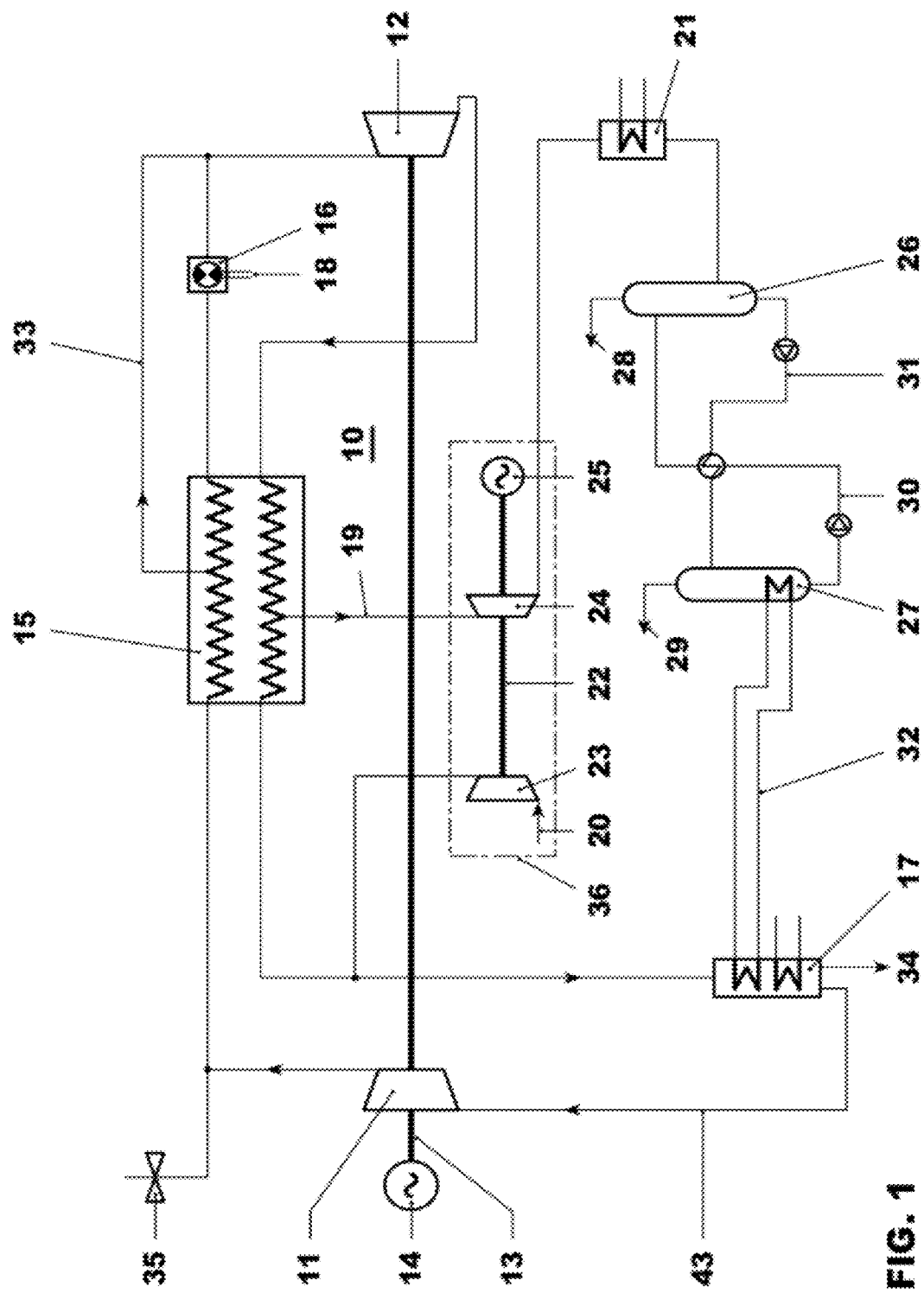
FIG. 1 shows a simplified process schematic diagram of a gas turbine plant with charging unit and $CO_2$ separation from the surplus fluid which is discharged to the atmosphere according to a first exemplary embodiment of the invention.

The invention should provide a remedy to the above-noted disadvantages. It is therefore the object of the invention to provide a gas turbine plant which utilizes the special advantages of a partially closed, charged gas turbine cycle for $CO_2$ separation, and also to disclose a method for its operation.

The object is achieved by means of the entirety of the features of claims 1 and 28. Exhaust gas recirculation via the low-pressure side of a recuperator is essential for the invention, wherein on the low-pressure side of this recuperator a charging unit with a compressor and a turbine is arranged, which charging unit draws in air via an inlet and by the outlet of its compressor is connected to the outlet of the low-pressure side of the recuperator and by the inlet of its turbine is connected to a surplus-gas extraction line on the low-pressure side in the recuperator, and provision is made for an optional $CO_2$ separator which separates $CO_2$ from the entire recirculated exhaust gases, or from a partial flow thereof, of the main gas turbine.

According to one development of the invention, inside the charging unit the compressor and the turbine are connected to a generator/motor via a common shaft.

In another development, compressor and turbine of the charging unit are connected to separate motor/generator units which can be operated at different controlled speeds.

In a further development of the invention, a precooler for the recirculated exhaust gas is arranged between the outlet of the recuperator and the inlet of the main compressor, which precooler is operated with a cooling medium, especially in the form of externally supplied water or steam, and has a condensate outlet for draining the water which is condensed in the precooler. The precooler in this case preferably exchanges heat via a heat transfer device with the $CO_2$ separator or with another device for utilizing the waste heat.

According to a further development of the invention, the outlet of the turbine of the charging unit is connected to the $CO_2$ separator and in that a surplus-gas cooler is arranged in this connection.

According to another development of the invention, the $CO_2$ separator includes a $CO_2$ absorption column and a $CO_2$ desorption column which are mutually interconnected via a first connecting line for $CO_2$-reduced sorption medium and a second connecting line for $CO_2$-enriched sorption medium.

In a further development of the invention, a quick relief valve is arranged in the connection between the main compressor and the combustion chamber, particularly on the cold side of the recuperator.

The main gas turbine and the recuperator, and if applicable the precooler, can advantageously be arranged in a common pressure vessel, wherein provision is made on the pressure vessel for a drain valve and/or an overpressure limiting valve for unexpected operating states. In this case, the main generator can be arranged either inside the pressure vessel and have a hydrogen cooling system, or can be arranged outside the pressure vessel and have an air or hydrogen cooling arrangement if not another fluid cooling system.

In a further development of this configuration, the pressure vessel is formed with accessibility for inspection and/or service and has at least one manhole and a ventilator and a safety shutoff of the fuel feed before access.

In a further development of the invention, for the cooling fluid supply of the main turbine and other thermally loaded parts of the main gas turbine, one or more partial flows are branched off from the recuperator and directed to the places to be cooled via supply lines.

In another development of the invention, the main compressor of the main gas turbine is divided into two or more sections, and intercoolers, which are operated with cooling water, are arranged between these sections.

In another development of the invention, the main turbine has a closed cooling system which is supplied via a booster compressor with cooling fluid which is extracted downstream of the main compressor, and the heated cooling fluid is returned to the main cycle upstream of the combustion chamber.

The $CO_2$ separator can also be arranged especially between the precooler and the inlet of the main compressor and for example comprise a $CO_2$ absorption system which operates under pressure.

In a preferred development of the operating method according to the invention, the average residual oxygen content at the outlet of the combustion chamber is at least 0.5%.

In another development of the invention, pure oxygen or an oxygen containing fluid is added upstream of the combustion chamber via a control valve.

In another development, the output of the gas turbine plant is controlled by controlling the gas inventory in the cycle of main gas turbine/recuperator. In this case, the mass flows of compressor and turbine of the charging unit are controlled independently of each other. In particular, variable speeds and/or movable guide vane rows in the compressor and/or in the turbine can be used for controlling these machines.

For the charging unit, a pressure ratio between a minimum value and a maximum design specification between 4 and 10 is preferably used, wherein the maximum values during partial-load operation lie between the minimum value and the maximum design specification.

DETAILED DESCRIPTION

In FIGS. 1 to 5, different exemplary embodiments of a gas turbine plant 10, 10' and 40, 40' with exhaust gas recirculation are reproduced. Each of the gas turbine plants comprises a main gas turbine with a main compressor 11 or 11a, 11b and a main turbine 12, which for example drive a main generator 14 via a common shaft. A combustion chamber 16, the outlet of which is connected to the inlet of the main turbine 12, has a fuel feed 18 and via the high-pressure side of a recuperator 15 obtains oxygenous fluid from the outlet of the main compressor 11 or 11a, 11b of the main gas turbine. The outlet of the main turbine 12 and the inlet of the main compressor 11 or 11a, 11b are interconnected via the low-pressure side of the recuperator 15 and the cooler 17 for exhaust gas recirculation. On the low-pressure side of the recuperator 15, a charging unit 36 with a compressor 23 and a turbine 24 is furthermore arranged. The charging unit 36 draws in air via an air intake 20. By the outlet of its compressor 23 the charging unit is connected to the outlet of the low-pressure side of the recuperator 15 and by the inlet of its turbine 24 is connected to a surplus-fluid extraction line 19 on the low-pressure side of the recuperator 15.

The inherent exhaust gas recirculation of the process produces an increased $CO_2$ concentration in the exhaust gas (typically 12-13 mass %). Therefore, the process can easily be associated with a $CO_2$ separating arrangement from the exhaust gas. According to the invention, therefore, provision can be made for a $CO_2$ separator, or means for separating $CO_2$, which separate $CO_2$ from the entire recirculated exhaust gases, or from a partial flow thereof, of the main gas turbine.

A plant of such a type, especially also such a plant which is provided with the subsequently described additional features, can be constructed in a basically much more compact manner than a conventional gas-turbine combined-cycle plant of the same power rating, be it with or without additional $CO_2$ separation. This, for a start, is because of the higher power density (specific power), with regard to the inducted-air mass flow, of up to over 1200 kJ/kg (in comparison to the 670 kJ/kg of the best gas-turbine combined-cycle plants). As a result, intake system and exhaust gas system in the specific sizes can be roughly halved. The main gas turbine or main machine 11, 12, 13, 15, 16 can be constructed smaller in their cross sectional areas by a factor which corresponds to the charging pressure ratio. Moreover, it preferably also has a smaller pressure ratio than a conventional gas turbine.

The charging unit 36, as a result of its smaller mass flow, also has an intake cross section which is smaller by more than the factor of 2 than a conventional gas turbine of the same power rating. The following components of a combined-cycle plant are not used:

Waste heat steam generator (HRSG),
Steam turbine,
Condenser,
Feedwater treatment system.

For this purpose, the recuperator 15 is used (which, however, on account of the higher pressure is smaller than the comparable HRSG), in addition to a precooler 17 which is arranged between the low-pressure outlet of the recuperator 15 and the inlet of the main compressor 11. In particular, the equipment for $CO_2$ separation is smaller than in the case of a comparable combined-cycle plant since only about half the mass flow is to be processed. It is also possible, however, to separate the $CO_2$ under pressure (see the $CO_2$-absorption system 49 in FIG. 3 which operates under pressure), as a result of which the $CO_2$ separation system can, with regard to the electric power, be of an even smaller construction.

Essentially everything which is used today in gas turbines and applied processes (combustible gases of all types, liquid hydrocarbons, etc.) can be used as fuel for the combustion chamber 16. Pure hydrogen could also come under this to a greater or lesser extent, wherein $CO_2$ separation is then naturally dispensed with. All other advantages of the concept according to the invention which go beyond the $CO_2$ separation, such as the high power density and the unrivalled operability in the partial load range, are maintained without detriment to efficiency and without increased exhaust gas emissions, this also applying when using a hydrogenous gas for the combustion.

The efficiency potential of a plant according to the invention without $CO_2$ separation is comparable to a conventional combined-cycle plant without $CO_2$ separation, particularly if efficiency-increasing features are built in, such as compression with intercooling, closed cooling systems and fuel preheating.

If one of the known absorption processes is used for $CO_2$ separation, use can be made in this case of the waste heat (in the region of 100° C. to 300° C.) which is delivered by the precooler 17 and/or by a surplus-gas cooler 21 which is arranged at the outlet of the turbine 24 of the charging unit 36, without detriment to efficiency ensuing, as would otherwise be the case for a known combined-cycle process (also referred to as "CC" or "GUD"). A $CO_2$ absorption system, according to the simplified example from FIG. 1 or FIG. 4, can comprise a $CO_2$ absorption column 26 and a $CO_2$ desorption column 27 which are mutually interconnected via a first connecting line 30 for $CO_2$-reduced sorption medium and a second connecting line 31 for $CO_2$-enriched sorption medium.

For the thermodynamic process, it would be inherently favorable to use the oxygen of the inducted air totally for the combustion. This, however, would result in the following disadvantages: The risk of incomplete combustion, the possible development of other pollutants, corrosion on the hot components in zones with reducing hot gas. A minimum oxygen surplus in the combustion chamber should therefore be maintained. The gas turbine plant of the invention is therefore operated preferably with an average residual oxygen content after the combustion chamber 16 of at least 0.5%.

The power density can also be increased even more by addition of an oxygenous gas or an oxygenous liquid. This addition is expediently carried out between the last cooling-fluid branch (supply line 33) in the recuperator 15 and the combustion chamber 16. Such a (variable) addition of an oxygenous fluid can also be carried out for temporary (quick) power increase (from a storage vessel). The latter is also referred to as power augmentation.

Figure 4:
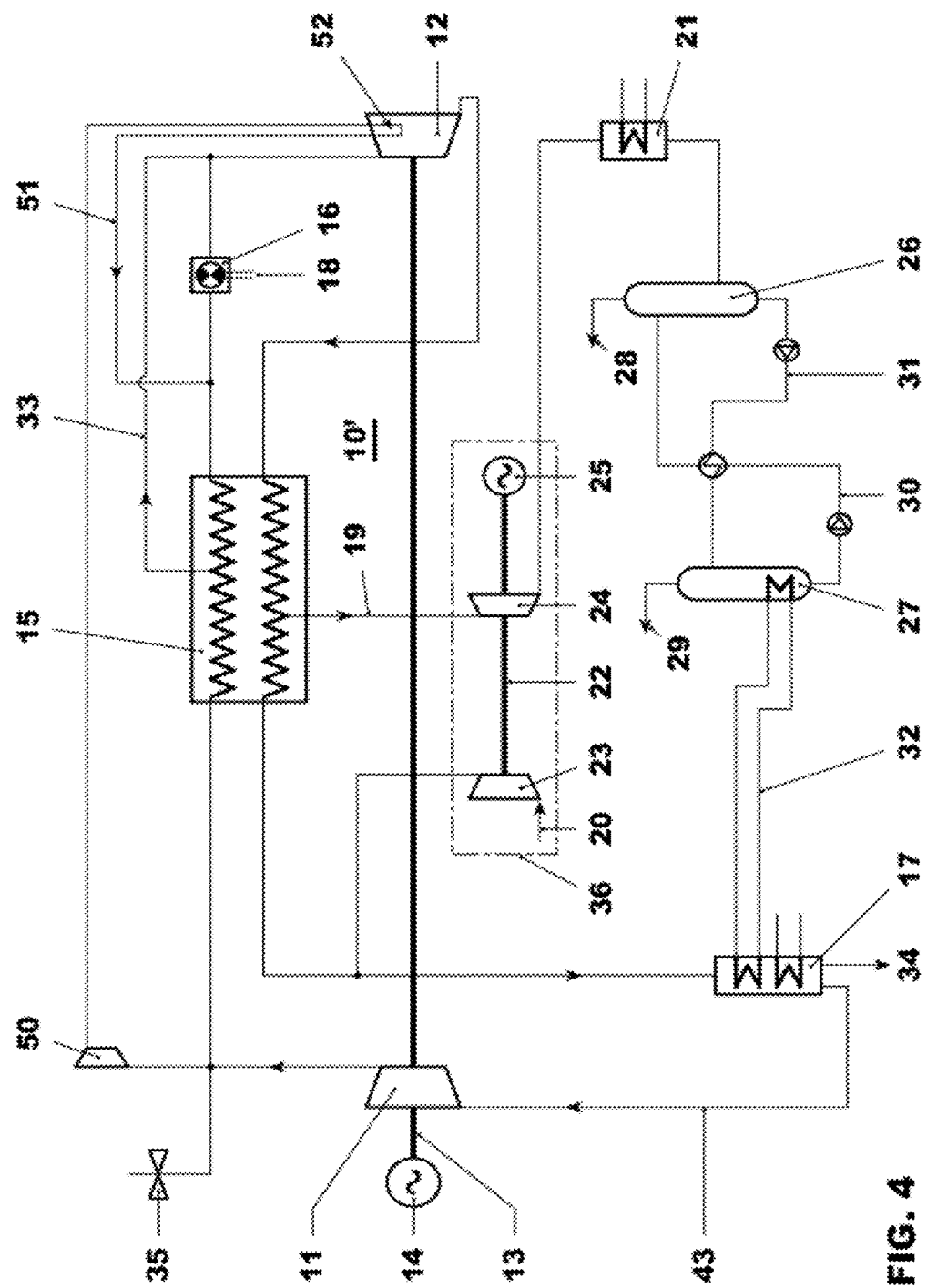
FIG. 4 shows a simplified process schematic diagram of a gas turbine plant with charging unit and $CO_2$ separation and also with an open and a closed cooling system of the main turbine according to a fourth exemplary embodiment of the invention.

In the case of loss of the electric mains connection of the main machine, as is customary in the case of gas turbines, the fuel inflow via the fuel feed 18 should immediately be automatically sharply restricted. On account of the recuperator 15, this, however, is perhaps not sufficiently effective in order to avoid an impermissible overspeed. As an additional feature, therefore, a quick relief valve 35 is preferably arranged in the connection between main compressor 11 and combustion chamber 16 (FIG. 1 and FIG. 4). This valve opens automatically, partially or completely, when known speed limits are exceeded and lowers the pressure in this connection (parallel to the fuel emergency stop which is to be activated at the same time). The quick relief valve 35 is expediently arranged on the cold side of the recuperator 15, as is shown in the figures.

The arrangement of the main machine with recuperator 15 and precooler 17 in a common pressure vessel 40, 40' (FIG. 2 and FIG. 3), at the pressure level of the induction by the main compressor 11, allows the inexpensive design of the low-pressure side of the heat exchanger for pressure differences in the order of magnitude of the specific pressure drop. In the pressure vessel 40, 40', the main machine, with the two-part main compressor 11a and 11b with intercooler 38, the combustion chamber 41 with fuel feed 18 and the main turbine 12, is arranged on the left-hand side. The exhaust gas of the main turbine 12 is introduced via a diffuser 42 into the low-pressure side of the subsequent recuperator 15, then delivered through the directly adjoining precooler 17 and, as recirculation flow 43 in the space between pressure-vessel wall and recuperator 15, is returned to the intake side of the low-pressure compressor 11a. The pressure vessel is therefore held at the temperature level of the outflow from the precooler, that is to say roughly at room temperature, which simplifies its design. The fluid which is compressed in the main compressor 11a, 11b is directed towards the combustion chamber 41 in counterflow to the low-pressure side of the recuperator 15. The intercooler 38 is operated with cooling water 39, and the precooler 17 is operated by a cooling medium 44 which can be water and/or steam. The precooler 17 operates at the same time as a condenser and has a condensate outlet 34 accordingly. The charging unit 36, which is arranged outside the pressure vessel 40, 40', draws in air via an air intake 20, compresses it in the compressor 23, and feeds it into the recirculation path between recuperator 15 and precooler 17. The exhaust-gas partial flow which is extracted via a surplus-gas extraction line 19 is guided through the turbine 24 of the charging unit 36 and via an exhaust-gas outlet 45 is discharged to the atmosphere, to a precooler or to a $CO_2$ separation plant (not shown in FIG. 2) according to FIG. 1 or the like.

Figure 2:
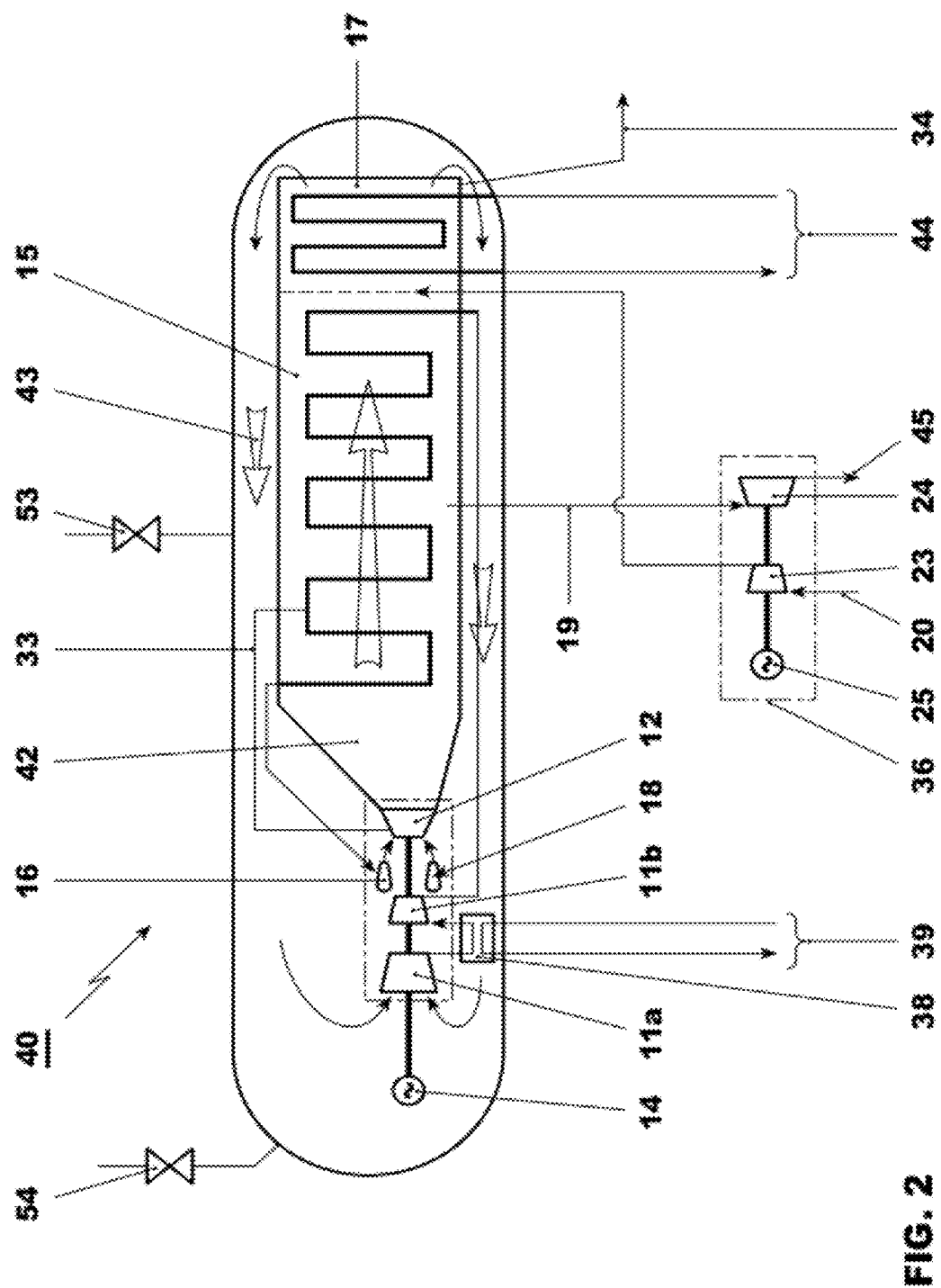
FIG. 2 shows a simplified arrangement schematic diagram of a gas turbine plant with common pressure vessel for the main gas turbine according to a second exemplary embodiment of the invention without $CO_2$ separation.
Figure 3:
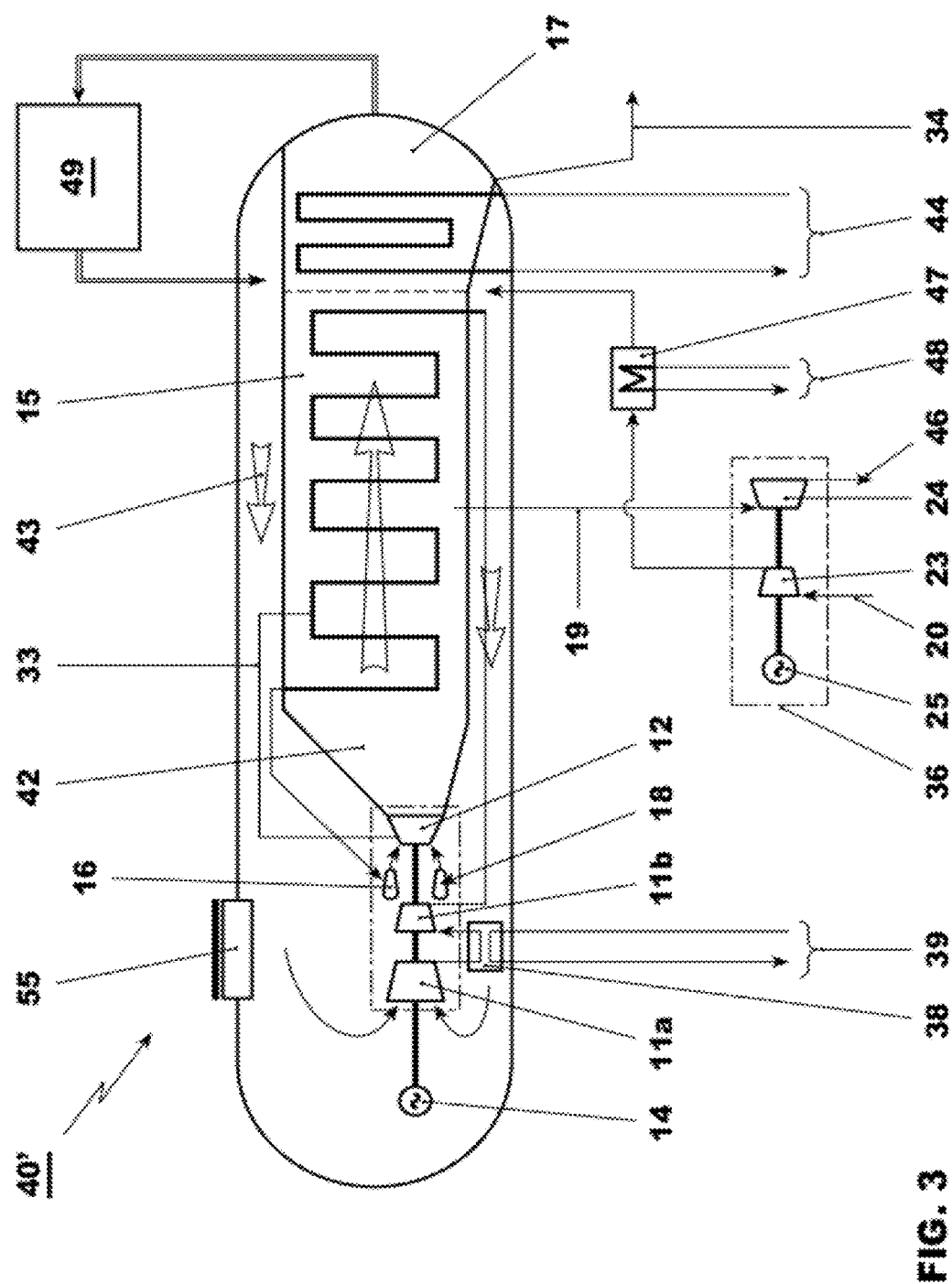
FIG. 3 shows a simplified arrangement schematic diagram of a gas turbine plant with common pressure vessel for the main gas turbine and $CO_2$ absorption system, operating under pressure, according to a third exemplary embodiment of the invention.

The main generator 14 in this case can be arranged inside or outside the pressure vessel 40, 40'. In the case of arrangement inside the pressure vessel 40, 40', as is shown in FIG. 2 and FIG. 3, the main generator 14 should have a hydrogen cooling system in order to minimize the gap friction losses. In the case of arrangement outside the pressure vessel 40, 40', a generator with air-cooling is also possible. For unexpected operating states, provision can be made in the configuration with pressure vessel 40 according to FIG. 2 for a drain valve 53 and also an overpressure-limiting valve 54 from this pressure vessel.

In the case of larger plants, the pressure vessel 40, 40', with the machine shut down and after purging with clean air, is accessible for inspection and service. Serving for this, according to FIG. 3, is at least one manhole 55 and also a circuit (not shown) in which the charging unit 36 together with the slowly driven main machine 11, 12, 13, 14 are used for the purging with air, wherein the fuel feed 18 must remain in a shut-off state by means of at least two serial valves.

A purging cycle, as just described, is also required before each start, especially in the case of gaseous fuels which could have accumulated as a result of leakages in the cavities of the machines and heat exchanger and constitute a risk of explosion. A special feature is disabling of the fuel feed and of the ignition, this being until purging of the system is verified in the relevant time interval.

Figure 5:
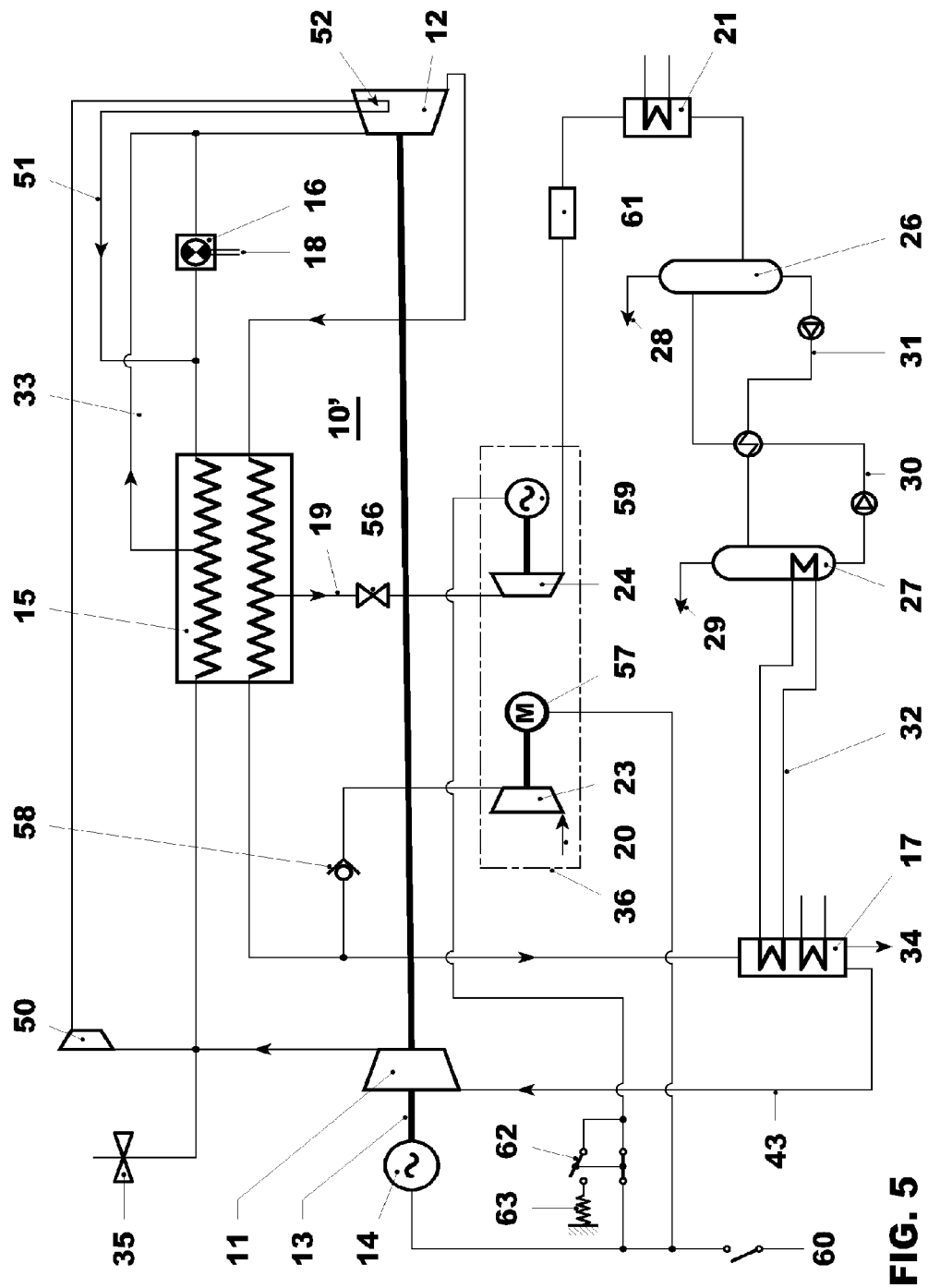
FIG. 5 shows a simplified process schematic diagram with division of the charging unit into two separate machine groups, wherein in this case the charging turbine is shown with an electric emergency braking resistor.

The use of the charging pressure, which is built up by the charging unit 36, for power governing with (almost) constantly maintained main-turbine inlet temperature has the advantage of an almost constant partial load efficiency and a constant $CO_2$ content in the exhaust gas even during partial load operation (only the amount of exhaust gas becomes less, roughly proportional to the power). Since the combustion, even at very low partial load, is held within the nominal temperature range, and since the residence times in the combustion chamber can also be kept constant, no increased NOx, CO and UHC concentrations in the exhaust gas are to be expected either. This so-called "inventory control" by a charging unit 36 is particularly advantageous when it can control both the incoming and also the discharging gas flow independently of each other. In this case, a variable speed and/or movable guide vane rows in the compressor 23 and turbine 24 are preferably used. The motor 25 in this case is also to be able to operate as a generator and via an electronic frequency converter can be connected to the electricity mains. The latter can also be used for starting up the charging unit 36. An advantageous alternative according to FIG. 5 are separate drives of charging compressor with motor 57 or charging turbine with generator 59, the speeds of which can be separately controlled via frequency converters.

For the charging unit 36, a pressure ratio of between just over 1 and a maximum design specification of 4 to 10 is advantageously used, wherein partial load states are operated with a pressure ratio between the two values. If the charging unit 36 is designed for a minimum pressure ratio of less than 1, however, partial-load operating states even lower than about 10 . . . 25% can also be operated. It would also be conceivable to operate the charging unit with a pressure ratio of about 1, which could technically be brought about by means of switchable bypass lines with or without restrictors instead of charging compressor and charging turbine. In the last two cases, shifted interfaces to the process of the main gas turbine could also be used, for example the fresh air intake (directly or after restriction or downstream of an expander) between precooler and main compressor.

A pressure ratio of 6 to 12 is advantageously used for the main machine 11, 12. This machine does not need adjustable guide vanes on account of the controlling by means of the charging pressure. It is conceivable, however, for the operating concept or the already mentioned power augmentation with oxygenous fluid to still require volumetric flow control. This could then be carried out either with variable compressor guide vanes in the main compressor 11 or with a variable bypass of the combustion chamber 16.

The turbine inlet temperature of the main machine is advantageously established within the range of 1000° C. to over 1300° C. (so-called ISO mixing temperature). In this case, the higher temperature ranges are preferably combined with a higher pressure ratio of the main machine in order to limit the turbine exhaust temperature to the design range of the recuperator 15. The inlet temperature of the turbine exhaust gas into the recuperator 15 in this case lies within the range of 600 to 800° C.

For the cooling fluid supply of the main turbine 12, of the rotor and/or of the hot gas liner, a partial flow at the appropriate temperature level (about 300°-500° C.) is preferably branched off from the recuperator 15 via a supply line 33. In the case of highly developed plants, a plurality of partial flows can also be at different temperature levels and/or in addition partial flows extracted directly from the main compressor 11, which can also have a lower pressure level.

If the main compressor 11 of the main machine is designed with intercooling (divided into low-pressure compressor 11*a* and high-pressure compressor 11*b* with intercooler 38 according to FIG. 2 and FIGS. 3), 3 to 6 efficiency percentage points can be gained. With a plurality of such intercooling arrangements, the efficiency could be increased even further.

In FIG. 1 and FIG. 4, the exhaust-gas partial flow which is extracted by means of the surplus-fluid extraction line 19 on the low-pressure side of the recuperator 15 is transmitted via the turbine 24 of the charging unit 36 and a surplus-fluid cooler 21 to a plant for $CO_2$ separation which comprises a $CO_2$ absorption column 26 and a $CO_2$ desorption column 27 which are mutually interconnected by means of a first connecting line 30 for $CO_2$-reduced sorption medium and a second connecting line 31 for $CO_2$-enriched sorption medium and have a $CO_2$ outlet 29 or discharge $CO_2$-reduced exhaust gas 28. In addition, heat from the precooler 17 is transmitted via a heat transfer device 32 to the $CO_2$ desorption column 27. The same arrangement for $CO_2$ separation could also be provided at the exhaust-gas outlet 45 of the charging unit 36 in FIG. 2.

As an alternative to the $CO_2$ separation system which is provided in FIGS. 1, 2 and 4, $CO_2$ separation under pressure can also be used, this being carried out according to FIG. 3 between the precooler 17 and the inlet into the main compressor 11 in a pressurized $CO_2$ absorption system 49. This has the advantage of smaller volumetric flows, as a result of which the $CO_2$ separation system can be of smaller construction. In this case, it is expedient to separately aftercool the charging air which comes from the compressor 23 of the charging unit 36 by means of a cooler 47 which is operated with cooling water 48 and to add the charging air upstream of the main compressor 11*a*, 11*b* only after $CO_2$ separation. The $CO_2$ absorption plant 49, which operates under pressure, can be built onto the system at the same time or later, wherein in the last case the barrier walls are then omitted, as is shown in FIG. 2.

In order to increase the efficiency and the power density of the gas turbine plant even further, a closed cooling system 52 (FIG. 4) can be used for the main turbine 12 and combustion chamber parts in addition to one or more intercooling arrangements of the main compressor 11 or 11*a*, 11*b*. The cooling fluid which is required for this, according to FIG. 4, is extracted downstream of the main compressor 11 or 11*a*, 11*b*, further compressed in a booster compressor 50, and then used for cooling combustion chamber 16, combustion-chamber liner, transition piece and/or principally the main turbine 12, preferably in the region of the hottest stages. The utilized (heated) cooling fluid is returned to the main cycle upstream of the combustion chamber 16. By means of such a cooling system, the mixing losses in the main turbine 12 can be reduced, as a result of which its polytropic efficiency is increased. Since in this case the (heated and oxygenous) cooling fluid also participates in the combustion, the power density is also increased. The arrangement of the booster compressor 50, as shown, has the advantage that an overpressure compared with the surrounding hot gas prevails in the closed cooling system. As a result, the system behaves more reliably in the case of leakages because no hot gas can penetrate into the cooling passages. As a variant, steam could also be used for such a closed cooling system. The heated (utilized) cooling steam could then either be introduced into the main cycle upstream of the combustion chamber 16, like the utilized cooling fluid, or could be expanded in a bottoming cycle. A cooling system of this type must also discharge some cooling fluid into the main process in the cooled parts, be it as a result of leakages or locally required film cooling. It is essential for at least some of the cooling fluid which is brought to a higher pressure in the booster compressor 50 to be returned to the main cycle upstream of the combustion chamber 16 after the parts to be cooled have been exposed to throughflow.

The precooler 17 and/or the cooler 21 (FIG. 1 and FIG. 4) can be formed as a heat exchanger or as a spray cooler. In this case, externally recooled water is sprayed into the rising fluid flow. The water which condenses from the fluid increases the quantity of sprayed water so that the surplus can be used in other ways, possibly even for an external wet cooling tower or as industrial water.

On account of the high pressure, depending upon design, in the combustion chamber 16, a gaseous fuel from a pipeline has to be compressed if necessary and subsequently heated to its application temperature. In the case of liquid gas, the evaporation is carried out preferably only after pumping to the required pressure for controlling and injecting. In the case of liquid fuel, the required pressure is created by means of one or more pumps. During partial-load operation, energy can be saved if the fuel pressure which is created by means of compressors or pumps is adapted to the pressure level of the combustion chamber (plus pressure drops in valves, pipes and injection nozzles).

In order to keep the oxygen content in the exhaust gas of the turbine 24 of the charging unit 36 as low as possible, it is expedient to extract the cooling medium in the supply line 33 not—as shown in FIG. 1—from the recuperator 15, but to extract it directly from the cooled exhaust gas of the main turbine 12 and to process it as cooling fluid. This fluid contains less oxygen and more $CO_2$ than the fluid which comes from the main compressor 11. Fluid extraction from the exhaust gas of the main turbine 12 before admixing of the fresh air from the compressor 23 of the charging unit 36 and separate cooling (with or without water condensation) in an additional recooler and also compression in a separate compressor to the cooling fluid pressure which is required by the main turbine 12 (and if necessary by the combustion chamber 16), is advantageous in this case. This measure also increases the power density since with the cooling fluid which is processed in this way less oxygen is directed past the combustion chamber.

Regardless of whether $CO_2$ separation is carried out or not, the described gas turbine plant can have further advantageous developments or features which have inherent inventive quality and are explained as follows. In particular, radial and/or axial types of construction of blading arrangements of compressors and turbines, and also of volumetrically operating compression and/or expansion machines can be used, wherein the axial types of construction of turbomachines are to be used particularly in the case of higher output and with regard to high blading efficiencies, and the volumetric machines are to be used in the case of low outputs.

Particularly in the case of the axial type of construction of the blading of the main machine (main compressor 11 and main turbine 12), it is to be taken into consideration that the blade flexural stresses are increased in proportion to the charging pressure ratio. In order to compensate this, the number of blades per ring has to be reduced and the blade chords have to be correspondingly increased. A special feature of the turbomachines in this case are blade numbers of less than 50 at least in individual blade rings (compared with the blade numbers of 50 to more than 200 which are otherwise customary in large machines).

During start-up, the main machine 11, 12, 13, 14 has to be started together with the charging unit 36, wherein either the generators 14 and 25 (or the motor 57) are used as starter motors or independent starting machines with electric drive or other types of drive. A special feature would therefore be the presence of a starting system which is independent of the normal operating state.

In the case of the speed of the main rotor (shaft 13) being 50 revolutions per second, for example, the technically possible maximum volumetric flow of the process air is limited by the existing material strength characteristics (at the compressor inlet and at the turbine exhaust). This, in the case of a typical (open) gas turbine, effects a power limit of today of still under 400 MW. As a result of charging the present process with the charging unit 36, this limit can be increased in proportion to the ratio of charging pressure to ambient pressure until the charging unit 36, which draws in air at atmospheric pressure, borders on the same limit. This allows broadening of the process according to FIG. 1 to power ratings of up to over 1000 MW with a charging unit 36, and even significantly higher when using a plurality of charging units which are connected in parallel.

In an even better controllable configuration (FIG. 5), the compressor 23 of the charging unit 36 is driven by a separate electric motor 57, whereas the turbine 24 of the charging unit 36 drives an extra generator 59, wherein speed/torque can be electrically controllable in the case of both. In the latter case, the turbine section must have either an electric (switchable resistor 62, 63) or mechanical emergency braking device and/or a fast shut-off valve 56 (see FIG. 5) in the surplus-gas extraction line 19. FIG. 5 shows, furthermore, in a summarily qualitative representation, the preferably common electric mains connection 60 via a common mains breaker of the generators/motors 14, 57, 59. The controllability of the difference of compressor 23 and turbine 24 mass flows by one or more of the aforementioned means, and also the use of the charging compressor drive 57 as a starter motor, can also be referred to as special features in this case.

For the case of a particularly low partial-load operation, the charging compressor 23, or a machine which can be connected in parallel, could operate as an expander, as a result of which the intake pressure of the main compressor 11 would lie below the ambient pressure. As a result, the charging turbine 24 would then have to operate as a compressor. A special feature in this case would be the possibility of a pressure ratio of less than 1 in the charging unit 36.

Should the system be designed with two or more generators and motors, then it is expedient to interconnect these machines in parallel in such a way that there is only one common mains connection (FIG. 5, item 60). This allows the separate supply of the plant in no-load operation to be maintained if the mains connection is lost.

The charging unit 36 (compressor 23 and/or turbine 24) can also be equipped with movable guide vanes in addition to the mentioned variable speed. As a result, the control range becomes even greater.

For improving the controllability, a plurality of compressors 23 and/or turbines 24 of different sizes can also be used in parallel in the charging unit 36. During partial-load operation, the larger charging machines then remain shut down and only the small or the smallest machines remain in operation. As a result, the partial-load efficiency can also be further improved.

In the case of altogether small unit sizes, the use of volumetric machines (such as piston engines, screw pumps and/or screw motors or gear pumps and/or gear motors, etc.) as charging compressor 23 or charging turbine 24 is also advisable. In the case of these machine types, the mass flows can be controlled particularly efficiently via the speed.

Instead of intercooling, water can also be injected into the main compressor 11. This is technically simpler than an intercooling arrangement or arrangements. On conventional gas turbines, it is today practiced under the names "high fogging", "over-fogging" or similar. A water injection device with fine nozzles at the compressor inlet and/or between individual compressor stages and/or after an intercooling stage is a feature in this case. "High fogging" can be used both with the charging compressor 23 and with the main compressor 11.

For further efficiency enhancement, which can be combined with the measures already mentioned above, the fuel can be preheated with heat which, depending upon version and temperature level, is extracted from one of the precoolers 17 or 21 or from a compressor intercooling arrangement. It would also be thermodynamically advantageous to use a compressor aftercooler for fuel preheating. Fuel preheating, for which the waste heat from one or more coolers integrated into the process is used, is a general feature. The use of an isothermal compressor as the main compressor 11, as is described for example in printed publication DE-A1-100 50 697, is also advantageous.

Special applications of the gas turbine plants which are described above are also advantageous:

The plants can especially be used as a ship's drive. Today, gas turbines are used if either low vibrations (cruisers) or a high peak power (warships) are desired. In the last-named case, gas turbines are often used in combination with diesel engines (so-called CODOG drives, "Combined Diesel or Gas Turbines", in the military navies). Conventional gas turbines, however, have a significantly lower efficiency than diesel engines and are unsuitable for low partial-load operation. Both disadvantages are eliminated by means of a system which is exemplified above (with or without $CO_2$ separation), which, moreover, is lighter and produces a cooler thermal signature. A further advantage of the systems according to the invention are the gas turbine-typically lower NOx emissions in comparison to diesel engines of ships. A drive of a ship with one or more primary energy sources in the present form with power transmission to the propulsion system by means of gears or electrically, wherein electric power can also be used for the internal power supply (hotel load) of the ship, are features in this case.

Since in the combustion chamber 16 a nitrogenous mixture is combusted, measures have to be taken against the development of NOx, as in the case of conventional gas turbines. One or more of the following technologies are additionally special features: Use of premix burners, water or steam injection into the flame, sequential combustion (like gas turbine type GT26 of the Assignee of the present application, the publications of which are integral elements of the present description), and use of an SCR ("Selective Catalytic Reduction") plant or an SNCR ("Selective Non-Catalytic Reduction") plant 61 integrated into the recuperator 15 at the correct temperature level. The system according to the invention, instead of power supply by a generator, can also be used as a mechanical drive (for example for pumps, compressors or propulsion of a ship). In this case, it can be expedient to construct the main machine 11, 12, 14 with two shafts, with a separate power turbine. In this way, the speed range for the drive can be broadened. In this case, the charging unit 36 could be designed for the power supply of the individual requirement if no electric mains connection is available. An auxiliary diesel or other starting aid method would then be necessary, however.

Finally, for applications in which a maximum of efficiency is desired, the part of the waste heat which is at a higher temperature, and not used for $CO_2$ separation and/or for fuel preheating, can be used in a "bottoming cycle" (Rankine cycle or Kalina cycle are examples) for power gain or power generation. Without $CO_2$ separation, more waste heat is naturally available for it. In this case, a potential for even higher thermal net efficiency results.

LIST OF DESIGNATIONS 10, 10', 40, 40' Gas turbine plant
11 Main compressor
11a Low-pressure compressor
11b High-pressure compressor
12 Main turbine
13, 22 Shaft
14 Main generator
15 Recuperator
16 Combustion chamber
17 Precooler
18 Fuel feed
19 Surplus-gas extraction line
20 Air intake
21 Surplus-gas cooler
23 Compressor (charging unit)
24 Turbine (charging unit)
25 Generator/motor (charging unit)
26 $CO_2$ absorption column
27 $CO_2$ desorption column
28 Exhaust gas ($CO_2$-reduced)
29 $CO_2$ outlet
30 Connecting line ($CO_2$-reduced sorption medium)
31 Connecting line ($CO_2$-enriched sorption medium)
32 Heat transfer device
33 Supply line (cooling medium)
34 Condensate outlet
35 Quick relief valve
36 Charging unit
38 Intercooler
39 Cooling water
40 Pressure vessel according to FIG. 2
40' Pressure vessel according to FIG. 3
42 Diffusor
43 Recirculation flow (cooled exhaust gas)
44 Cooling medium (steam or water)
45 Exhaust gas outlet ($CO_2$ separation)
46 Exhaust gas outlet (exhaust stack or cooler)
47 Cooler
48 Cooling water
49 Pressurized $CO_2$ absorption system
50 Booster compressor for the cooling fluid
51 Return line for the heated cooling fluid
52 Closed cooling system
53 Drain valve
54 Overpressure limiting valve
55 Manhole
56 Control- and fast shut-off valve in the extraction line 19
57 Motor of the charging compressor 58 Check valve in the discharge line of the charging compressor
59 Generator of the charging turbine
60 Electricity mains
61 SCR- or SNCR system
62 Coupled switchover to the emergency braking resistor
63 Emergency braking resistor

What is claimed is:

1. A gas turbine plant with exhaust gas recirculation, comprising at least one main gas turbine (11, 12, 13, 16) having at least one main compressor and at least one main turbine which drives a main generator or other machine, and at least one combustion chamber, an outlet of which is connected to an inlet of the at least one main turbine of the at least one main gas turbine, has a fuel feed, and via a high-pressure side of a recuperator obtains combustion air from an outlet of the at least one main compressor of the at least one main gas turbine, wherein an outlet of the at least one main turbine and an inlet of the at least one main compressor of the at least one main gas turbine are connected via a low-pressure side of the recuperator and a cooler for exhaust gas recirculation, and wherein, on the low-pressure side of the recuperator, a charging unit with a compressor and a turbine is arranged, the charging unit draws in air via an air intake and by an outlet of the compressor is connected to an outlet of the low-pressure side of the recuperator and by an inlet of the turbine is connected to a surplus-gas extraction line on the low-pressure side of the recuperator, and wherein a $CO_2$ separator separates $CO_2$ from exhaust gas from the charging turbine and wherein for cooling fluid supply of the at least one main turbine and other thermally loaded parts of the at least one main gas turbine, one or more partial flows are branched off from the recuperator and directed to the places to be cooled via at least one supply line.

2. The gas turbine plant as claimed in claim 1, wherein the inlet temperature of the exhaust gases from the at least one main turbine into the recuperator lies within the range of 600°-800° C.

3. The gas turbine plant as claimed in claim 1, wherein the at least one main turbine has blade rings with less than 50 blades.

4. The gas turbine plant as claimed in claim 1, wherein the turbomachines which are part of the charging unit are equipped with movable guide vanes.

5. The gas turbine plant as claimed in claim 1, wherein the charging unit comprises volumetric machines.

6. The gas turbine plant as claimed in claim 5, wherein the volumetric machines are piston engines, screw pumps or screw motors, gear pumps or gear motors.

7. The gas turbine plant as claimed in claim 1, wherein inside the charging unit the compressor and the turbine are connected to a generator/motor via a common shaft.

8. The gas turbine plant as claimed in claim 1, wherein the cooler is operated as a precooler with an externally supplied cooling medium, in the form of water or steam, and has a condensate outlet for draining the water which condenses in the precooler.

9. The gas turbine plant as claimed in claim 8, wherein the precooler, via a heat transfer device, exchanges heat with the $CO_2$ separator or for other thermal purposes.

10. The gas turbine plant as claimed in one claim 9, wherein the outlet of the turbine of the charging unit is connected to the $CO_2$ separator and wherein a surplus-gas cooler is arranged in this connection.

11. The gas turbine plant as claimed in 1, wherein the $CO_2$ separator comprises a $CO_2$ absorption column and a $CO_2$ desorption column which are mutually interconnected via a first connecting line for $CO_2$-reduced sorption medium and a second connecting line for $CO_2$-enriched sorption medium.

12. The gas turbine plant as claimed in claim 1, wherein a quick relief valve is arranged in the connection between the main compressor and the combustion chamber, on a cold side of the recuperator.

13. The gas turbine plant as claimed in claim 1, wherein the power rating is over 400 MW.

\* \* \* \* \*